United States Patent [19]

Schaefer et al.

[11] 4,082,012
[45] Apr. 4, 1978

[54] TRANSMISSION AND CONTROL WITH CENTRIFUGAL DUMP VALVE

[75] Inventors: Robert H. Schaefer, Westfield; Ted M. McQuinn, Carmel, both of Ind.

[73] Assignee: General Motors Corporation, Detroit, Mich.

[21] Appl. No.: 760,226

[22] Filed: Jan. 17, 1977

[51] Int. Cl.² ............................................. B60K 41/04
[52] U.S. Cl. .................................. 74/864; 192/104 F
[58] Field of Search ........................ 74/859, 864, 733; 192/109 F, 104 F, 3.29

[56] References Cited

U.S. PATENT DOCUMENTS 3,691,872   9/1972   Schaefer et al. ........................ 74/864

*Primary Examiner*—Samuel Scott
*Assistant Examiner*—Frank H. McKenzie, Jr.
*Attorney, Agent, or Firm*—A. M. Heiter

[57] ABSTRACT

A multiratio powershift transmission having fluid operated drive devices including a forward clutch with an apply chamber supplied with fluid apply pressure to engage the clutch for forward drives and exhausted to disengage the clutch for reverse drive. The apply chamber is in a housing rotating at input speed during forward and reverse drive. In forward drive, a dump valve mounted on the rotating housing is biased closed by a spring, static fluid apply pressure, and centrifugal pressure head, in the rated input speed range. At a higher speed, centrifugal force on the dump valve element opens the dump valve to exhaust the apply chamber and disengage forward drive. In reverse drive, the dump valve is biased closed only by the spring which at idle speed closes the dump valve, and at a low speed used in reverse drive, centrifugal force opens the dump valve to flush the dump valve during reverse drive.

5 Claims, 5 Drawing Figures

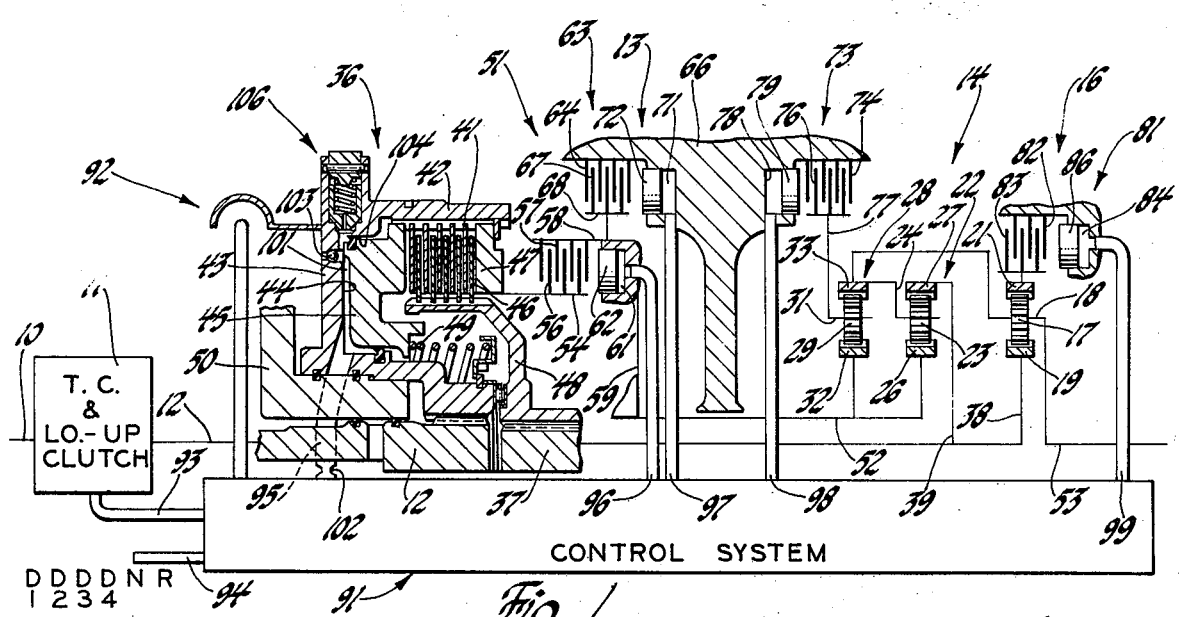

TRANSMISSION AND CONTROL WITH CENTRIFUGAL DUMP VALVE

This invention relates to transmissions having fluid operated drive engagement controls and particularly to transmission controls with speed responsive dump valves for disengaging rotary fluid operated drive controls.

This invention provides in a transmission having a rotary fluid operated drive device with a rotary apply chamber supplied with apply fluid for establishing a forward drive and exhausted for disestablishing the forward drive, a dump valve which is normally closed during normal rated speed range operation in forward drive and opens to dump the apply chamber to disestablish forward drive in response to operation at a higher speed, and which is open, when the apply chamber is exhausted to disestablish forward drive, during normal speed range operation in another transmission operating phase, to flush the dump valve.

This invention is particularly employed in a transmission having a forward clutch with an apply chamber in a rotary housing which rotates at a speed proportional to input speed during both forward and reverse drive. The forward apply pressure is supplied to the forward apply chamber to engage the forward clutch for forward drive. The forward apply chamber is exhausted and reverse apply pressure is supplied to other fluid operated devices to establish reverse drive. The centrifugal force responsive dump valve is mounted on the rotary housing and connected to the radial outer portion of the forward apply chamber. During normal forward drive in the rated speed range of the transmission, the total closing bias force provided by a spring, by the static fluid pressure supplied to the apply chamber and by the centrifugal pressure head of the rotating fluid in the apply chamber holds the dump valve closed against the centrifugal force of the movable dump valve element. At a higher speed, the centifugal force of the movable dump valve element overcomes the total closing bias force to open the dump valve to dump or exhaust fluid from the forward apply chamber to disestablish forward drive. During normal speed reverse drive when the forward apply chamber is exhausted, the total closing bias force, provided only by the spring, is overcome at a low normal speed of the rotary housing used in reverse drive to open the dump valve in response to centrifugal force on the dump valve element to flush the dump valve.

These and other features of the invention are more fully explained in the following description and accompanying drawings, wherein:

FIG. 1 is a schematic view of the transmission gearing and controls;

FIG. 2 is an enlarged view of the dump valve portion of FIG. 1;

FIG. 3 is a sectional view of FIG. 2 on the line 3—3;

FIG. 4 is a sectional view of FIG. 3 on the line 4—4; and

FIG. 5 is a plot of the force acting on the dump valve relative to housing speed.

In this description of the invention, an automatic transmission having a high or overspeed control system, a conventional automatic transmission having the essential features for employing this invention, is briefly described. For further details of such a conventional transmission having a torque converter, lockup clutch, powershift gearing, and automatic output speed and torque demand responsive shift controls, reference may be made to U.S. Pat. No. 3,691,872, granted to Robert H. Schaefer and Joseph R. Fox on Sept. 19, 1972.

Referring to the drawing, FIG. 1 shows the power train having an input shaft 10 driving a conventional rotary torque converter and lock-up clutch 11 connected in parallel to drive intermediate or gear transmission input shaft 12 of powershift transmission 13.

The powershift transmission 13 has a 4-speed gear unit 14 having three planetary gearsets. The rear of first gearset 16 has planetary pinions 17 mounted on carrier 18 and meshing with sun gear 19 and ring gear 21. The second gearset 22 has planetary pinions 23 rotatably mounted on carrier 24 and meshing with sun gear 26 and ring gear 27. The third gearset 28 has planetary pinions 29 mounted on carrier 31 and meshing with sun gear 32 and ring gear 33.

The forward clutch 36 is engaged in all forward drive ratios and connects the converter output or intermediate shaft 12 to drive the gear unit primary input shaft 37 which drives, through hub 38, sun gear 19 of first gearset 16 and, through hub 39, ring gear 27 of second gearset 22. The forward clutch 36 has input plates 41 spline mounted on input drum 42 integral with and driven by hub 43 rotating on housing portion 50, and spline drive connected to shaft 12. The rotary hub 43 has a cylinder 44 formed therein for piston 45. On the supply of fluid by forward drive line 95 to cylinder 44, piston 45 engages input plates 41 and output plates 46 against backing plate 47 fixed to input drum 42. The output plates 46 are spline drive connected by a hub 48 to drive primary input shaft 37. A retraction spring 49, seated on an abutment on hub 43, biases portion 45 to the disengaged position. The other clutches and brakes have conventional retraction springs and backing plates. Fourth speed clutch 51 connects intermediate shaft 12 to secondary input shaft 52 which drives sun gears 26 and 32 of the respective second and third gearsets 22 and 28 and with forward clutch 36 drive, locks the gearing for 1:1 drive from carrier 24, ring gear 33, and carrier 18, to the output shaft 53. The 4th speed clutch 51 has an input drum 54 formed as a continuation of backing plate 47 fixed to input drum 42, and is thus driven by intermediate shaft 12 and drives input plates 56. The output plates 57 are connected by output drum 58 and hub 59 to secondary input shaft 52. The hub 59 has a cylinder 61 formed therein for piston 62. On the supply of fluid to cylinder 61 by 4th clutch apply line 96, piston 62 engages the plates 56, 57, to effect a drive from intermediate shaft 12 to secondary input shaft 52 to drive sun gears 26 and 32. The secondary input shaft 52 may also be held by the 3rd speed brake 63 which has fixed plates 64 grounded to housing 66 and rotary plates 67 spline connected through drum 68 and hub 59 to secondary input shaft 52 to hold shaft 52. When fluid is supplied by 3rd apply line 97 to cylinder 71 formed in housing 66 to move piston 72 to engage plates 64 and 67, 3rd speed brake 63 is engaged to hold secondary input shaft 52 and the sun gears 26 and 32. The 2nd speed brake 73 has a plurality of fixed plates 74 fixed by splines to the housing 66, and rotary plates 76 connected by hub 77 to carrier 31 of the third gearset 28. When the fluid is supplied by 2nd supply line 98 to cylinder 78, piston 79 moves to engage the plates 74, 76, and holds carrier 31. The 1st and reverse brake 81 has a plurality of fixed plates 82 secured by splines to housing 66 and rotary plates 83 spline drive connected to ring gear 21. When fluid is supplied by 1st and reverse brake apply line 99 to the cylinder 84 formed in housing 66 to move the piston 86 and engage plates 82, 83, the ring gear 21 of the first gearset 16 is held.

CONTROLS

The brakes and clutches are engaged by the supply of fluid by their respective apply lines of the control system 91, as indicated by "X" on the following chart, and the others disengaged and their apply lines exhausted to provide Neutral (N), four forward speeds, and Reverse (R).

|  | BRAKES | | | CLUTCHES | |
| --- | --- | --- | --- | --- | --- |
|  | 1st-R | 2nd | 3rd | 4th-R | For'd |
| RATIO DEVICE | 81 | 73 | 63 | 51 | 36 |
| APPLY LINE | 99 | 98 | 97 | 96 | 95 |
| DRIVES: | | | | | |
| Reverse [R] | X | | | X | |
| Neutral [N] | X | | | | |
| Forward 1 | X | | | | X |
| Speeds 2 | | X | | | X |
| 3 | | | X | | X |
| 4 | | | | X | X |

The control system 91 is conventional and may be a manually controlled powershift transmission control system, or an automatic speed and torque demand responsive transmission control system as shown in the above U.S. Pat. No. 3,691,872 Schaefer et al.

The control system 91 has an input governor 92; controls to supply lockup apply line 93 for engagement of the lockup clutch; a conventional manual control 94 to select Reverse [R] drive, Neutral [N], and one or more forward drive ranges, such as D4, D3, D2, and D1, each providing automatic shifting up to the drive ratio indicated; a forward apply line 95 for engaging forward clutch 36; a 4th and reverse apply line 96 for engaging 4th and reverse clutch 51; a 3rd apply line 97 for engaging 3rd brake 63; a 2nd apply line 98 for engaging 2nd brake 73; and 1st and reverse apply line 99 for enaging 1st and reverse brake 81.

Such control systems, as is well known, also include an output speed governor and shift valves. One example of a suitable conventional control system is shown in the above Schaefer et al U.S. Pat. No. 3,691,872. The forward clutch 36 is supplied with pressure fluid by forward apply line 95 in all forward drive ratios, and forward apply line 95 is exhausted in reverse drive.

In the forward clutch 36, the forward apply rotary chamber 101 is located between cylinder 44 and piston 45 and is supplied by forward apply line 95 which has a feed restriction 102. The feed restriction 102 has a conventional size for a smooth quick shift for a good quality shift on engagement of the forward clutch 36 to initiate 1st ratio drive. A conventional ball relief valve 103 as shown in U.S. Pat. No. 2,740,512 Fischer patented Apr. 3, 1956, mounted in hub 43 exhausts apply chamber 101 from a point spaced a small distance within the outer diameter 104 of apply chamber 101, when forward apply line 95 is exhausted and hub 43 is rotating. The ball relief valve 103 is conventionally used to exhaust the rotating apply chamber 101 during a shift from a forward drive to neutral. An overspeed centrifugal dump valve 106 exhausts forward apply chamber 101 in response to overspeed, when intermediate or gearing input shaft 12 is rotating at a predetermined speed above rated input speed, to disengage forward clutch 36 and disestablish any forward drive and also dumps to flush the centrifugal dump valve 106 during reverse operation at a normal low reverse drive operation speed of gearing input shaft 12. The centrifugal dump valve 106 has a valve housing 107 formed integrally with, and located radially outside the outer diameter 104 of the apply chamber 101. The dump valve housing 107 has a radial bore 108 with a valve element 109 radially and reciprocally mounted in the bore 108. At the radial outer open end 111 of bore 108, a closure member 112 is fitted in the bore 108 and secured therein by a pin 113 pressed into aligned apertures 114 in the closure member 112 and valve housing 107, to seal the bore 108 and provide a spring abutment. A coil spring 116 is seated on the radial inner side of closure member 112, is guided in a bore 117 in valve element 109, and seats on a flat spring seat portion 118 of the end wall 119 of the valve element 109. The valve element end wall 119 has, on its radial inner side, a conical sealing surface 121 engaging the conical surface valve seat 122 when the valve element 109 is in the closed position as shown in FIG. 2. The conical valve seat 122 is formed on the corner of a shoulder 123 between the bore 108 and smaller diameter of dumping passage 124 at dumping port 125 extending from bore 108 to the outer diameter 104 of apply chamber 101. A port 126 extends through valve element end wall 119 from dumping port 125 to the closed bias chamber 127 formed in bore 108. The size of port 126 is not critical, but is sufficiently large, preferably about the same size as feed restriction 102, so that there is no significant time lag between the pressure change in apply chamber 101 and bias chamber 127.

The pressure in dumping port 125 acts on a small area of valve element 109 within valve seat 122, and the pressure in bias chamber 127 acts on the larger full area of valve element 109. A pair of exhaust ports 128, 129, which are drilled passages extending from front face 131 of hub 43 to intersect the bore 108 centrally with respect to shoulder 123, with one exhaust port 128 or 129 on each side of bore 108. When the dump valve 106 opens, apply chamber 101 is exhausted through dumping passage 124 which includes dumping port 125, the space between conical valve seat 122 and sealing surface 121 when the valve is open and exhaust ports 128, 129.

OPERATION

When the conventional control system 91 is operating so as to provide any forward drive, fluid under regulated pressure is supplied by forward apply line 95 to forward apply chamber 101 to move piston 45 to engage plates 41-46 and forward clutch 36. Then selective engagement of 1st brake 81, 2nd brake 73, 3rd brake 63, or 4th clutch 51, by the control system 91 completes or provides establishment respectively of 1st, 2nd, 3rd, or 4th ratio drives. In all forward ratio drives, regulated fluid pressure from a source is supplied by control system 91 to forward apply chamber 101 in rotary housing hub 43 to act on piston 45 to apply forward clutch 36, and flows through passage 124 in valve housing 107 rotating with housing hub 43, and port 126 in valve element 109 to bias chamber 127, to provide a total fluid pressure seating or closing bias force (curve TPFF, FIG. 5) on valve element 109 of centrifugal dump valve 106. The spring 116 provides a closing spring bias force in forward and reverse drives (curve SFFR), plotted relative to the zero force, which is high or maximum at zero housing speed and decreases with increasing housing speed, due to centrifugal force acting on the mass of the spring 116, to a zero bias force in the high normal or rated forward drive speed range. In all forward drives, the total fluid pressure bias force forward (curve TPFF) has two components, the constant static pressure force forward (curve SPFF), plotted relative to zero force, and the centrifugal pressure or head force forward, which increases with housing speed and the speed of rotation of the fluid or oil in apply chamber 101 and bias chamber 127, as shown as a centrifugal oil head vector added to the static pressure force forward (curve SPFF, FIG. 5) to provide total pressure force forward (curve TPFF). The spring bias force in forward and reverse (curve SFFR) is also added to the above closing total pressure bias force forward (curve TPFF), and is plotted as spring bias force forward (curve SFF) relative to the constant static pressure bias force forward (curve SPFF) to demonstrate how the spring bias force forward and the total pressure force forward are added to provide the total bias force forward (curve TFF).

The valve element 109, during rotation of the housing, hub 43 has a valve-opening centrifugal bias force (curve CF FIG. 5) which increases with housing hub speed. At a predetermined dump speed, (speed D), an overrun operation speed occurring when the vehicle or load is driving the engine above the normal or rated transmission operating speeds encountered when the engine drives the vehicle or other load, the valve opening centrifugal bias force (curve CF) overcomes, or is greater than, the valve closing total bias force forward (curve TFF), to open centrifugal dump valve 106 to dump fluid from apply chamber 101 to disengage forward clutch 36 to disengage any forward drive ratio. During dumping operation, fluid flows through a dumping flow passage 124 provided by dumping port 125, the space between the valve element sealing surface 121 and seat 122 of open dump valve 106, and dual exhaust ports 128, 129. Restriction 102 in forward apply line 95 is sufficiently large for normal smooth and rapid engagement of forward clutch 36, and sufficiently small relative to the restriction of the dumping flow path so that the intermediate pressure in apply chamber 101 between these restrictions is quickly reduced and does not provide an apply force on piston 45 greater than the retraction or release force provided by retraction spring 49, so the forward clutch 36 is quickly and positively disengaged without excessive slip. When the dump valve 106 opens for fluid dumping, there is a quick reduction of pressure in bias chamber 127, reducing the closing bias force so that the valve 106 remains open until housing hub 43 speed is reduced to a lower speed, about the same speed (speed F) as centrifugal force (curve CF) becomes less than the spring bias force (curve SFFR). When the centrifugal dump valve 106 dumps fluid and decreases apply pressure in apply chamber 101 to disengage forward clutch 36, the ball relief valve 103 will also open.

In neutral and reverse drive, the control system 91 exhausts the forward apply line 95, and apply chamber 101 is exhausted through forward apply line 95 and opens ball dump valve 103, but a small amount of residual fluid remains in apply chamber 101 at the outer perimeter between ball dump valve 103 and the outer diameter 104 of apply chamber 101. Thus, in neutral and reverse drives there is no significant fluid pressure valve closing bias force, but only the closing spring bias force (curve SFFR), acting to close centrifugal dump valve 106. Thus on a normal neutral to a forward drive manual shift at idle throttle, the centrifugal dump valve 106 is closed, and normal engagement of forward clutch 36 is provided.

On manual shifting of the control system 91 to reverse drive, fluid is supplied to engage the 4th clutch 51 and 1st brake 81 to establish reverse drive. When the vehicle operator increases throttle to increase engine speed, and thus the speed of housing hub 43 and valve housing 107 from a normal idle speed value, e.g., 800 to 1,000 rpm to, or above, a normal low speed for reverse drive operation, e.g., 1,200 rpm, increasing centrifugal valve opening bias force (curve CF, FIG. 5) becomes greater than the total force in reverse (curve TFR), which is the same as spring force (curve SFFR), to open centrifugal dump valve 106 to exhaust the small amount of residual fluid in apply chamber 101 to flush the dumping flow path of centrifugal dump valve 106.

It will be appreciated that modifications of the invention may be made.

We claim:

1. In a transmission: a multiratio gear unit having an input rotating in an input drive rated speed range and an output drive higher speed range, an output and a plurality of drive devices including a forward drive device selectively operated to establish forward drives and reverses drive; a source of regulated fluid pressure; control means connected to said source and operatively connected to said drive devices operative in a forward drive position to control the supply of fluid from said source to said drive devices including said forward drive device to selectively establish said forward drives, operative in reverse drive position to control the supply of fluid from said source to said drive devices to establish said reverse drive; and operative in neutral position to control the supply of fluid from said source to said drive devices to provide neutral dump valve means operatively connected to said forward drive device and having a valve element operative in one position to disengage said forward drive device and in another position to permit engagement of said forward drive device and having total biasing means biasing said valve element with a total bias force to said another position including first biasing means providing a first bias force decreasing with increasing input speed and second biasing means providing a second bias force increasing with increasing input speed, and said valve element being responsive to a centrifugal bias force providing a centrifugal bias force increasing with input speed to bias said valve element to said one position and operative in said foward drive position of said control means in response to said total bias force overcoming said centrifugal bias force to move said valve element to said another position to maintain establishment of any selected one of said forward drives throughout said input drive rated speed range and to move said valve element to said one position to disestablish any selected one of said forward drives at and above a predetermined output drive speed in said output drive higher speed range and operative in another position of said control means to disestablish said second bias force and to move said valve element to said one position in response to said centrifugal bias force overcoming said first bias force at a predetermined low input speed in said input drive rated speed range to flush said small residual amount of fluid through said dump valve means.

2. In a transmission: a multiratio gear unit having an input rotating in an input drive rated speed range and an output drive higher speed range, an output and a plurality of drive devices including a forward drive device selectively operated to establish forward drives and reverse drive; a source of regulated fluid pressure; control means connected to said source and operatively connected to said drive devices operative in a forward drive position to supply fluid from said source to said drive devices including said forward drive device to selectively establish said forward drives, operative in reverse drive position to exhaust said forward drive device except for a small residual amount of fluid and supply fluid from said source to other drive devices to establish said reverse drive; and operative in neutral position to exhaust said forward drive device except for a small residual amount of fluid and to exhaust other drive devices to provide neutral dump valve means operatively connected to said forward drive device mounted for rotation at a speed related to the speed of said input and having a valve element operative in open position to exhaust fluid from and disengage said forward drive device and in closed position to close to discontinue dump valve means exhaust from said forward drive device to permit engagement of said forward drive device and having total biasing means biasing said valve element with a total bias force to said closed position including first biasing means providing a first bias force decreasing with increasing input speed and second biasing means providing a second bias force increasing with increasing speed, and said valve element being responsive to centrifugal force providing a centrifugal bias force increasing with input speed to bias said valve element to said open position and operative in said forward drive position of said control means in response to said total bias force to move said valve element to said closed position to maintain establishment of any selected one of said forward drives throughout said input drive rated speed range and to move said valve element to said open position to disestablish any selected one of said forward drives at and above a predetermined output drive speed in said output drive higher speed range and operative in another position of said control means to disestablish said second bias force and to move said valve element to said open position in response to said centrifugal bias force overcoming said first bias force at a predetermined low input speed in said input drive speed range to open said dump valve means to flush said small residual amount of fluid through said dump valve means.

3. In a transmission: a multiratio gear unit having an input, an output and a plurality of drive devices selectively operated to establish a plurality of forward ratio drives and a reverse drive and including a fluid operated forward drive device having a rotary housing drive connected to said input for rotation in all drives in an input drive rated speed range from idle speed to full-rated speed and an output drive higher speed range and a chamber in said housing having a radial outer portion and expanding in response to fluid pressure for establishing all said plurality of forward ratio drives; a source of regulated fluid pressure; control means connected to said source and to said plurality of drive devices operative in a plurality of forward drive positions to connect said source to said chamber of said forward drive device and selectively to other drive devices to selectively establish said plurality of forward ratio drives, and operative in reverse drive position to exhaust said chamber and to selectively operate another drive device to establish said reverse drive; centrifugal dump valve means mounted on said rotary housing having a dumping passage connected to said radial outer portion of said chamber to exhaust valve closure means operative in open position to open said dumping passage to exhaust said chamber and in closed position to close said dumping passage to prevent exhaust, total biasing means on said rotary housing biasing said valve closure means with a total bias force to closed position including spring biasing means providing decreasing spring bias with increasing rotary housing speed and fluid pressure biasing means responsive to fluid pressure in said radial outer portion of said chamber providing increasing pressure bias force with increasing rotary housing speed, and said valve closure means being responsive to centrifugal force providing a centrifugal bias force increasing with rotary housing speed to bias said valve closure means to open position and operative in all forward drive positions of said control means in response to the supply of fluid pressure to said chamber and said biasing means providing said total bias force to close said valve closure means to maintain establishment of any selected forward ratio drive throughout said input drive rated speed range and to open said valve closure means to disestablish any selected forward drive at and above a predetermined speed in said output drive higher speed range and operative in reverse drive position of said control means in response to exhaust of fluid pressure from said chamber disabling said fluid pressure biasing means to close said valve closure means in response to said spring bias force overcoming said centrifugal bias force at idle speed and to open said valve closure means in response to said centrifugal bias force overcoming said spring bias force at a predetermined low speed in said input drive rated speed range in reverse drive to flush said centrifugal dump valve means.

4. In a transmission: a multiratio gear unit having an input, an output and a plurality of drive devices selectively operated to establish a plurality of forward ratio drives and a reverse drive and including a fluid operated forward drive device having a rotary housing drive connected to said input for rotation in all drives in an input drive rated speed range and an output drive higher speed range and a chamber in said housing having a radial outer portion and expanding in response to fluid pressure for establishing said plurality of forward ratio drives; a source of regulated fluid pressure; control means connected to said source and to said plurality of drive devices operative in a plurality of forward drive positions to connect said source to said chamber of said forward drive device and selectively to other device devices to selectively establish said plurality of forward ratio drives, operative in reverse drive position to exhaust said chamber and to selectively operate another drive device to establish said reverse drive, and operative in neutral position to exhaust said chamber and other drive devices to provide neutral; centrifugal dump valve means mounted on said rotary housing, having a dumping passage connecting said radial outer portion of said chamber to exhaust valve closure means operative in open position to open said dumping passage to exhaust said chamber and in closed position to close said dumping passage total biasing means on said rotary housing biasing said valve closure means with a total bias force to closed position including spring biasing means providing decreasing spring bias force with increasing rotary housing speed and fluid pressure biasing means responsive to fluid pressure in said radial outer portion of said chamber providing increasing pressure bias force with increasing rotary housing speed, and said valve closure means being responsive to centrifugal force providing a centrifugal bias force increasing with rotary housing speed to bias said valve closure means to open position and operative in all forward drive positions of said control means in response to the supply of fluid pressure to said chamber and said biasing means providing said total bias force to close said valve closure means to maintain establishment of any selected forward ratio drive throughout said input drive rated speed range, to open said valve closure means to exhaust said chamber to disestablish any selected forward ratio drive at and above a predetermined speed in said output drive higher speed range and to disable said fluid pressure biasing means and to close said valve closure means when said spring bias force overcomes said centrifugal bias force at a low speed in said input drive rated speed range to reestablish forward drive, and operative in reverse drive position of said control means in response to exhaust of fluid pressure from said chamber to disable said fluid pressure biasing means to close said valve closure means in response to said spring bias force overcoming said centrifugal bias force at idle speed, to open said valve closure means in response to said centrifugal bias force overcoming said spring bias force at a predetermined low speed in said input drive rated speed range normally employed in reverse drive to flush said centrifugal dump valve means, and operative in neutral at idle speed in response to said spring bias force to close said centrifugal dump valve means.

5. In a transmission: a multiratio gear unit having an input, an output and a plurality of drive devices selectively operated to establish a plurality of forward ratio drives and a reverse drive and including a fluid operated forward drive device having a rotary housing drive connected to said input for rotation in all drives in an input drive rated speed range and an output drive higher speed range, a retraction spring, a chamber in said housing having a radial outer portion and expanding in response to fluid pressure for establishing said plurality of forward ratio drives and contracted on exhaust of fluid pressure by said retraction spring to disestablish said plurality of forward drives and relief valve means on said rotary housing connecting said chamber from a point just within said radial outer portion operative during rotation of said housing in said input drive rated speed range to close in response to the supply of static fluid pressure to said chamber and to open in response to the exhaust of the supply of static fluid pressure to exhaust the centrifugal pressure head except for a small volume of residual fluid in said radial outer portion; a source of regulated fluid pressure; control means having a feed restriction and connected to said source and operatively connected to said plurality of drive devices operative ina plurality of forward drive positions to connect said source through said feed restriction to said chamber of said forward drive device and selectively to other drive devices to supply static fluid pressure to close said relief valve means and to selectively establish said plurality of forward ratio drives, operative in reverse drive position to exhaust said chamber opening said relief valve means and to selectively operate another drive device to establish said reverse drive, and operative in neutral position to exhaust said chamber opening said relief valve means and to exhaust other drive devices to provide neutral; centrifugal dump valve means mounted on said rotary housing, having a dumping passage connecting said radial outer portion of said chamber, to exhaust having a flow capacity in relation to the flow capacity of said feed restriction to quickly reduce the pressure in said chamber so the retraction spring contracts said chamber, valve closure means operative in open position to open said dumping passage to exhaust said chamber and in closed position to close said dumping passage, total biasing means on said rotary housing biasing said valve closure means with a total bias force to closed position including spring biasing means providing decreasing spring bias force with increasing rotary housing speed and fluid pressure biasing means responsive to fluid pressure in said radial outer portion of said chamber providing increasing pressure bias force with increasing rotary housing speed, and said valve closure means being responsive to centrifugal force providing a centrifugal bias force increasing with rotary housing speed to bias said valve closure means to open position and operative in all forward drive positions of said control means in response to the supply of fluid pressure to said chamber and said biasing means providing said total bias force to close said valve closure means to maintain establishment of any selected forward ratio drive throughout said input drive rated speed range and to open said valve closure means to exhaust said chamber to disestablish any selected forward ratio drive at and above a predetermined speed in said output drive higher speed range and to disable said fluid pressure biasing means to hold said valve closure means open until said centrifugal bias force at a low speed in said input drive rated speed range is less than said spring bias to close said valve closure means to reestablish forward drive, and operative in reverse drive position of said control means in response to exhaust of fluid pressure from said chamber to open said relief valve means and to disable said fluid pressure biasing means to close said valve closure means in response to said spring bias force overcoming said centifugal bias force at idle speed, and retain a small volume of residual fluid in said chamber to open said valve closure means in response to said centrifugal bias force overcoming said spring bias force at a predetermined low speed in said input drive rated speed range normally employed in reverse drive to flush said residual fluid through said centrifugal dump valve means, and operative in neutral at idle speed in response to said spring bias force overcoming said centrifugal force to close said centrifugal force dump valve means.

* * * * *